(12) United States Patent
Yoshimura et al.

(10) Patent No.: US 8,897,374 B2
(45) Date of Patent: Nov. 25, 2014

(54) AUDIO VISUAL SYSTEM AND DECODER THEREFOR

(75) Inventors: Masaki Yoshimura, Kanagawa (JP); Koji Yamauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 12/461,673

(22) Filed: Aug. 20, 2009

(65) Prior Publication Data

US 2010/0054341 A1 Mar. 4, 2010

(30) Foreign Application Priority Data

Sep. 4, 2008 (JP) ................................ 2008-227506

(51) Int. Cl.

| H04N 7/12 | (2006.01) |
|---|---|
| H04N 19/61 | (2014.01) |
| H04N 21/434 | (2011.01) |
| H04N 21/43 | (2011.01) |
| H04N 19/00 | (2014.01) |
| H04N 21/2368 | (2011.01) |

(52) U.S. Cl.
CPC ............. *H04N 21/4341* (2013.01); *H04N 7/50* (2013.01); *H04N 21/4307* (2013.01); *H04N 7/26335* (2013.01); *H04N 21/2368* (2013.01)
USPC .................................. 375/240.25; 375/240.1

(58) Field of Classification Search
None
See application file for complete search history.

(56) References Cited

U.S. PATENT DOCUMENTS

| 6,229,852 B1* | 5/2001 | Hoang ...................... 375/240.25 |
|---|---|---|
| 6,587,823 B1* | 7/2003 | Kang et al. ..................... 704/275 |
| 7,986,866 B2* | 7/2011 | Tanaka et al. ................. 386/248 |
| 2002/0110369 A1* | 8/2002 | Mori et al. ...................... 386/98 |
| 2002/0135608 A1* | 9/2002 | Hamada et al. ................ 345/723 |
| 2002/0145702 A1* | 10/2002 | Kato et al. .......................... 352/1 |

FOREIGN PATENT DOCUMENTS

| JP | 2003-348489 A | 12/2003 |
|---|---|---|
| JP | 2006-148679 A | 6/2006 |
| JP | 2007-318604 A | 12/2007 |
| WO | WO-2006-025441 A1 | 3/2006 |
| WO | WO-2008/056622 A1 | 5/2008 |

OTHER PUBLICATIONS

Japanese Office Action issued Jun. 15, 2010 for corresponding Japanese Application No. 2008-227506.

\* cited by examiner

*Primary Examiner* — Hassan Phillips
*Assistant Examiner* — Mark A Mais
(74) *Attorney, Agent, or Firm* — Rader, Fishman & Grauer PLLC

(57) ABSTRACT

An audio visual system includes an input unit for receiving data containing video data and audio data and dividing the data into the audio data and the video data, a video decoder for decoding the video data divided by the input unit, an audio decoder for decoding the audio data divided by the input unit, and an output unit for superimposing and outputting the video data decoded by the video decoder and the audio data decoded by the audio decoder. The video decoder or audio decoder has a plurality of data output paths and sets delay times for each of the output paths to synchronize the decoded video data with the decoded audio data.

12 Claims, 7 Drawing Sheets

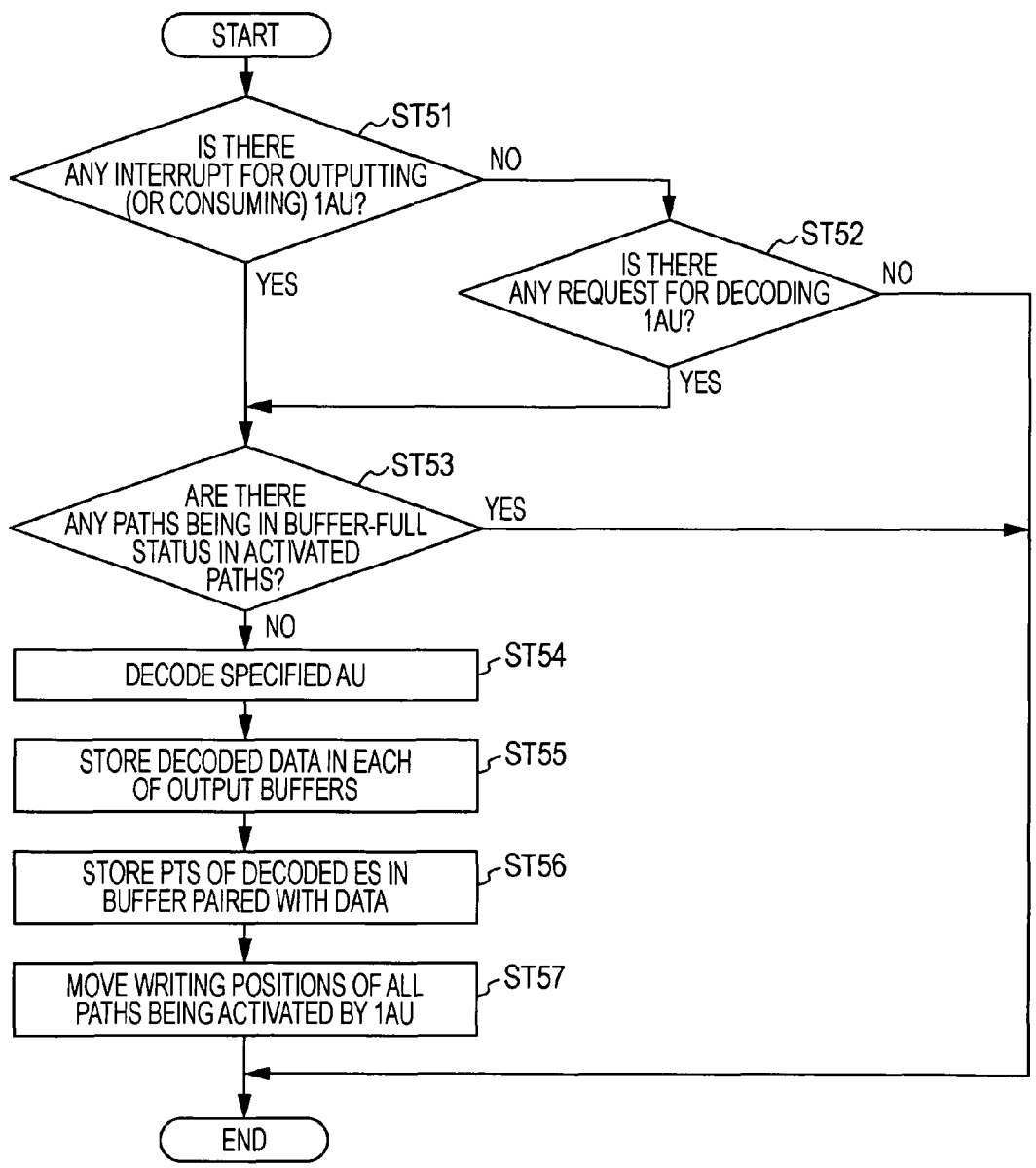

AUDIO VISUAL SYSTEM AND DECODER THEREFOR

BACKGROUND OF THE INVENTION

1. Field of the Invention

The present invention relates to an audio visual system and a decoder therefor for decoding audio data and video data and outputting them in a synchronized manner in response to an input of AV data with those data superimposed therein.

2. Description of the Related Art

Recently, a variety of video and audio equipments have been prevailed. A user can obtain video and audio signals in various output forms from the same source data by selecting an output path that satisfies his/her intention. For instance, output paths of video signals include a high definition (HD) output and a standard definition (SD) output. The HD output is defined as a high-definition or high-resolution video output, while the SD output is defined as an image output having standard resolution or image quality. Meanwhile, output paths for audio signals include a multi-channel (e.g., 5.1 channel) output, a stereo (2 channel) output, the Sony/Philips Digital Interface (S/PDIF) output, etc., for example.

SUMMARY OF THE INVENTION

When signals can be output from a variety of output paths as described above, each of the paths may have different amount of signal delay.

For instance, in a case of video signals, in order to obtain better video outputs, a video quality improvement engine often performs a process for the HD output in addition to a regular process of video signal reproduction such as a decode process. However, for the SD output, the above additional process is not performed by the engine even for video signals from the same source.

In this case, the HD output may have a delay relative to the SD output due to the process by the engine.

Additionally, in a case of audio signals for example, the S/PDIF output may have a delay relative to the multi-channel output or the stereo output due to the decode process.

Now, video signals and audio signals generated originally in a synchronized manner should also be output in that manner on reproduction output. As a result, each combination of the video signals and the audio signals is to be synchronized on output. This synchronization is referred to as Audio Visual (AV) synchronization.

As described above, in a case that video signals and audio signals have different amount of delay for each output path, a delay control will be independently performed for each of the paths. In this case, if one video or audio output equipment has a plurality of output paths, interrupts of delay control to a control CPU will increase in proportion to the number of the paths.

This increases processing burdens on the CPU, causing the increase of the processing amount in the entire system.

According to the present invention, an audio visual system and a decoder therefor are provided that, when there is a plurality of output paths, and a certain synchronization process is necessary for combinations of the paths, can reduce processing burdens caused by a delay control necessary for the synchronization process.

According to a first embodiment of the invention, an audio visual system includes: an input unit for receiving the input of data containing video and audio data and dividing the data into the video and audio data; a video decoder for decoding the video data divided by the input unit; an audio decoder for decoding the audio data divided by the input unit; and an output unit for superimposing and outputting the video data and the audio data, wherein the video decoder or the audio decoder has a plurality of data output paths, sets a delay time for each of the output paths, and synchronizes the decoded video data and the decoded audio data.

According to a second embodiment of the invention, a decoder includes: a control unit for performing a decode process of video data or audio data; buffer memories for storing the video data or the audio data decoded by the control unit, provided with the number corresponding to that of the output paths; and output interfaces provided with the number corresponding to that the output paths, wherein the output interfaces read the decoded video data or audio data from the buffer memories for each of the output paths and send interrupt signals independent for each of the output paths to the control unit every time reading the predefined amount of data, and the control unit performs the decode process and a buffer management process to manage writing or reading of the decoded video data or audio data to or from the buffer memories in response to the interrupt signal from the output interface having the shortest delay among the interrupt signals from the output interfaces.

When there is a plurality of output paths, and a certain synchronization process is necessary for combinations of the paths, processing burdens caused by a delay control for the synchronization process can be reduced.

BRIEF DESCRIPTION OF THE DRAWINGS

FIG. 7 is a flow chart illustrating control by a control unit of a decode process and a buffer management process (for writing).

DESCRIPTION OF THE PREFERRED EMBODIMENTS

Now an embodiment of the present invention will be described.

Figure 1:
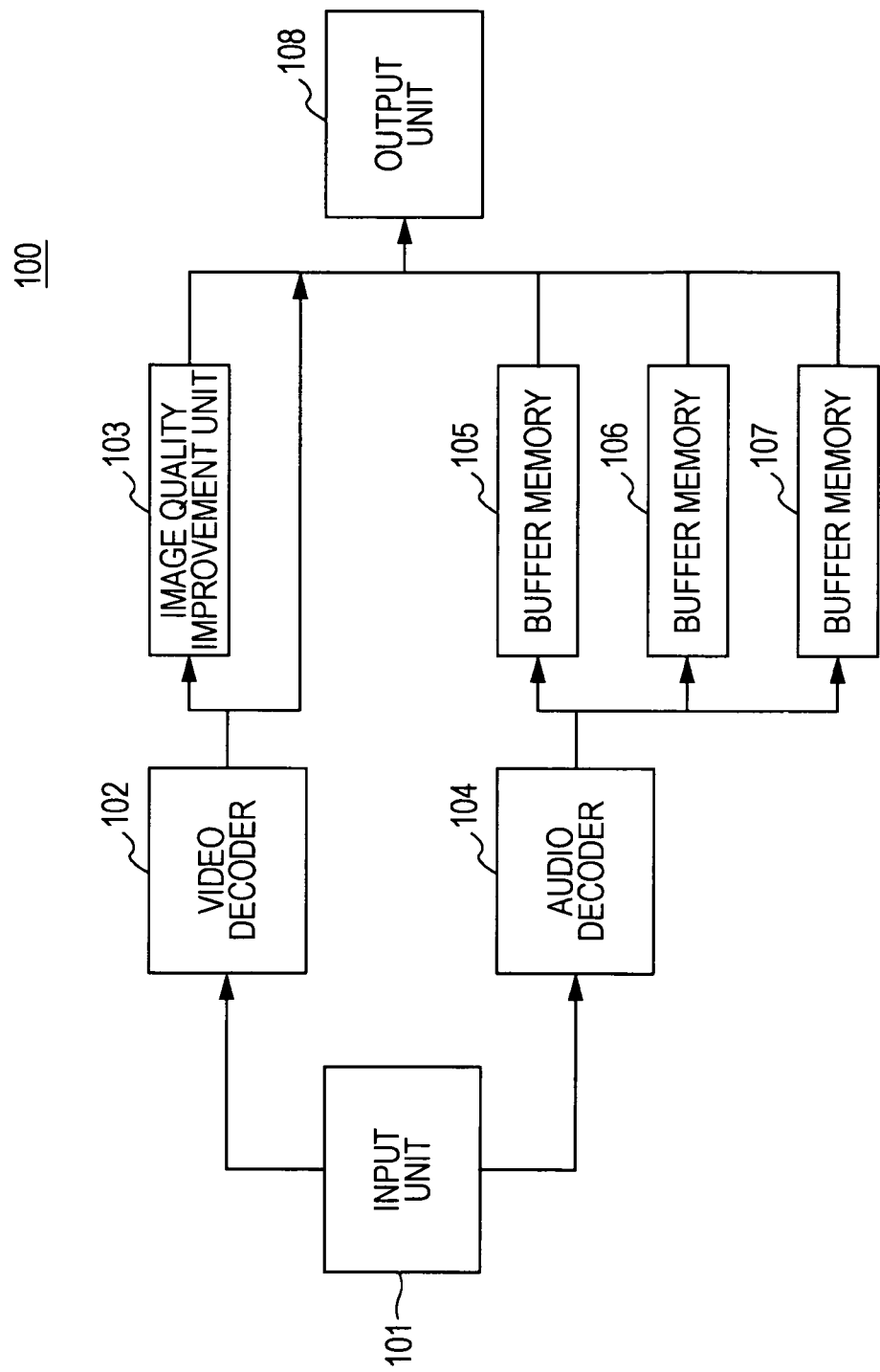
FIG. 1 is a block diagram illustrating an exemplary configuration of an AV system according to an embodiment of the present invention.

FIG. 1 illustrates a block diagram of an exemplary configuration of Audio-Visual (AV) system 100 according to an embodiment of the present invention.

As shown in FIG. 1, AV system 100 includes an input unit 101, a video decoder 102, an image quality improvement unit 103, an audio decoder 104, buffer memories 105 to 107, and an output unit 108.

The input unit 101 receives data input. The data input into the input unit 101 is streaming data in which video data and audio data are superimposed. The AV streaming data to be received by the input unit 101 is streaming data in the MPEG2 format, for example.

The input unit 101 then divides the AV data input in the input unit 101 into video data and audio data, which in turn are transferred to the video decoder 102 and the audio decoder 104, respectively.

The video decoder 102 decodes the video streaming data transferred from the input unit 101. The video decoder 102 has, for example, two types of output formats; a high definition (HD) output and a standard definition (SD) output. Depending on a decode process by the video decoder 102, there arises a difference between the delay of the HD output data and that of the SD output data. The image quality improvement unit 103 improves the image quality of the HD output data output from the video decoder 102. An image improvement method by the image quality improvement unit 103 is not limited herein. The image quality improvement process of the image quality improvement unit 103 causes a delay in video streaming data. As a result, a temporal difference arises between the video streaming data and audio data that were superimposed in the AV streaming data prior to the dividing by the input unit 101.

The audio decoder 104 decodes audio streaming data transferred from the input unit 101. The audio decoder 104 outputs the decoded audio data in three types of output format; 5.1ch output format, stereo output format, and S/PDIF output format.

The audio data of three types of output format output from the audio decoder 104 are temporarily stored in the buffer memories 105 to 107, respectively.

Note that due to the decode process of the audio decoder 104, the audio data of three types of output format have different delay times.

The detailed configuration and operation of the audio decoder 104 will be described below.

The output unit 108 superimposes the video data output from the video decoder 102 and the audio data output from the audio decoder 104 and outputs them as AV data.

As described above, since both of the processing times of video data and audio data vary with output path, there arises a different delay time for each of the output paths.

To address this problem, the AV system 100 performs an AV synchronization process for synchronizing video data with audio data so as to adjust the delay time different for each output path of the video data and audio data.

In the AV data output from the AV synchronization process, video data and audio data are temporally synchronized. Thus, there will be no difference between the reproduction timing of video data and that of audio data on the reproducing of AV data by a reproduction equipment (not shown).

Now, AV synchronization process of the AV system 100 will be described.

Figure 2:
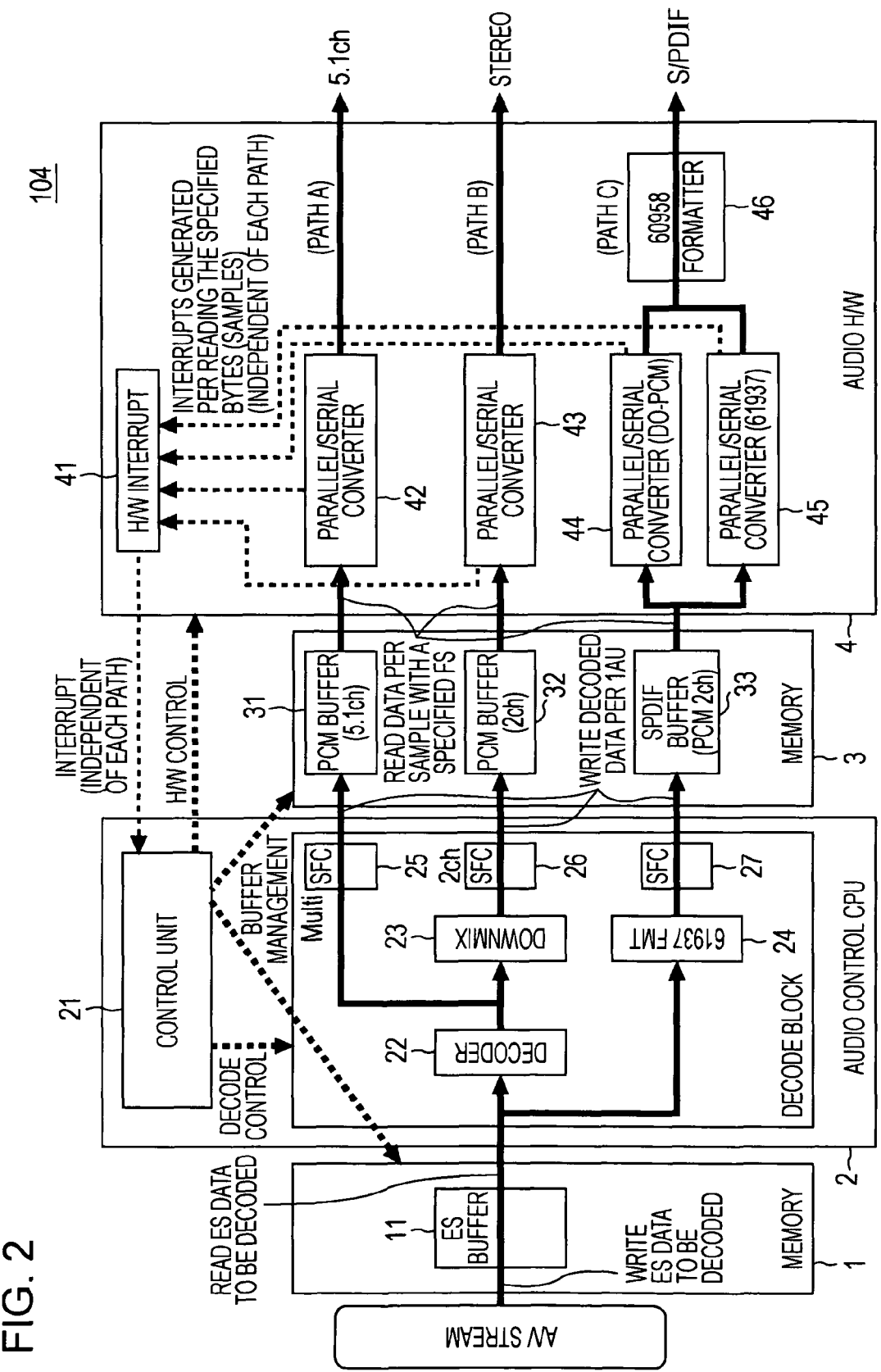
FIG. 2 is a block diagram of an exemplary configuration of an audio decoder.

FIG. 2 illustrates a block diagram of an exemplary configuration of the audio decoder 104.

As shown in the drawing, the audio decoder 104 includes a memory 1, an audio control CPU 2, a memory 3, and an audio hardware (H/W) 4 (which corresponds to an output interface of the embodiment of the present invention).

The memory 1 has an ES buffer 11 for buffering audio streaming data input from the input unit 101.

The ES buffer 11 is a buffer memory for buffering an elementary stream (ES). The elementary stream means encoded image data or audio data.

For example, streaming data in the MPEG2 format assumed to be input in the AV system 100 of this embodiment may be composed of program stream (PS) or transport stream (TS) obtained by dividing the elementary stream.

As shown in FIG. 2, the audio control CPU 2 has a control unit 21, a decoder 22, a down-mixing control unit 23, an IEC 61937 formatter 24, and SRCs 25 to 27.

The control unit 21 is a control CPU for performing a decode control for each component of the audio control CPU 2, the decoder 22, the down-mixing control unit 23, the IEC 61937 formatter 24, and the SRCs 25 to 27 in the audio control CPU 2, a buffering control of the memory 1 and memory 3, and a hardware control of the audio hardware 4.

The decoder 22, the down-mixing control unit 23, the IEC 61937 formatter 24, and SRCs 25 to 27 are decoding blocks for decoding (decrypting) audio streaming data buffered in the ES buffer 11.

The decoder 22 retrieves audio streaming data buffered in the ES buffer 11 and decodes the data in accordance with the decode control of the control unit 21. The above description of the decode process of the decoder 22 is not any limitation to the detail of the process, and any existing techniques may be used for the process.

In response to interrupts transferred from the audio H/W 4 described below (or triggered by an interrupt signal), the control unit 21 controls the decoder 22 to perform a decode process.

Audio streaming data decoded by the decoder 22 is multi-channel streaming data such as 5.1ch streaming data.

The down-mixing control unit 23 performs the down-mixing of the multi-channel streaming data. Down-mixing means converting a multi-channel surround source into a streaming data having the number of channels matching to a listening environment. In this embodiment, the input of 5.1ch multi-channel audio streaming data is down-mixed to 2ch stereo data.

The IEC 61937 formatter 24 formats the audio streaming data buffered in the ES buffer 11 so that it complies with the IEC 61937 specification.

The IEC 61937 is a specification specified by the International Electro-technical Commission (IEC) and is related to compressed digital audio data transferred using an S/PDIF interface.

Thus, the IEC 61937 formatter 24 can convert the format of the audio streaming data buffered in the ES buffer 11 to a format corresponding to the S/PDIF.

Each of the SRCs 25 to 27 converts the sampling frequency of input audio streaming data to its optimal frequency.

As illustrated in FIG. 2, the multi-channel audio streaming data decoded by the decoder 22 is input into the SRC 25.

Additionally, as illustrated in FIG. 2, the 2ch audio streaming data down-mixed by the down-mixing control unit 23 is input into the SRC 26.

Furthermore, also as illustrated in FIG. 2, audio streaming data for S/PDIF output is input into the SRC 27.

In this way, the audio control CPU 2 converts audio streaming data to multi-channel streaming data, stereo streaming data, and S/PDIF streaming data, respectively.

The three formats of streaming data as generated in such a way are then temporarily stored in each buffer of 5.1ch buffer 31, stereo buffer 32 and S/PDIF buffer 33 of the memory 3, respectively.

The audio H/W 4 has an interrupt control unit 41, parallel serial converters 42 to 45, and an IEC 60958 formatter 46.

The audio H/W 4 reads audio streaming data stored in three buffers of the memory 3 with a specified frame number, converts the read data to serial data with parallel serial converters 42 to 45, and outputs the converted data.

Specifically, the 5.1ch streaming data read from the 5.1ch buffer 31 is converted to serial data by the parallel serial converter 42 and output.

Similarly, the stereo streaming data read from the stereo buffer 32 is converted to serial data by the parallel serial converter 43 and output.

Furthermore, the S/PDIF streaming data read from the S/PDIF buffer 33 is converted to serial data by the parallel serial converters 44 and 45. Then by formatting with the IEC 60958 formatter 46 so as to comply with the IEC 60958 specification, streaming data in an S/PDIF format is output.

Note that the S/PDIF is defined by IEC 60958.

Hereinafter, a transfer path from which 5.1ch audio streaming data will be output by the parallel serial converter 42, that from which stereo audio streaming data will be output by the parallel serial converter 43, and that from which S/PDIF audio streaming data will be output by the IEC 60958 formatter 46, are referred to as path A, path B, and path C, respectively.

When executing parallel serial conversion with the parallel serial converters 42 to 45, each of the parallel serial converters 42 to 45 transmits an interrupt signal to the interrupt control unit 41.

Specifically, the converters 42 to 45 generate an interrupt every time the predetermined amount of streaming data is read (or for each reading operation of the predetermined bytes of data).

The interrupt control unit 41 transfers the generated interrupt to the control unit 21.

The control unit 21 directs the respective blocks described above to perform the predetermined processes in response to the transferred interrupts.

Here, "predetermined processes" encompass a synchronization determination process for synchronizing output signals of the video decoder 102, a decode process for directing the decoder 22 to perform a decoding, and a buffer management process for controlling a writing or reading for each buffer memory of the memory 1 and 3.

The synchronization determination process is defined as a process for notifying the video decoder 102 of interrupts from any of the output paths so as to perform AV synchronization.

The decode process is defined as a process of decoding audio streaming data in the above audio decoder 104 with the decoder 22, the down-mixing control unit 23, the IEC 61937 formatter 24, and the SRCs 25 to 27.

Finally, the buffer management process is defined as a process for controlling the writing packets in audio stream to or reading the packets from the buffers 31 to 33 of each path of the memory 3.

As described above, the audio decoder 104 of the AV system 100 according to this embodiment has three output paths, namely paths A to C. The AV system 100 of this embodiment performs a synchronization determination process, a decode process, and a buffer management process triggered by interrupts from one of the output paths in order to reduce burdens on the control unit 21 imposed by decode processes or buffer management processes of three output paths.

In particular, the control unit 21 performs a synchronization determination process, a decode process, and a buffer management process triggered by interrupts from the output path that outputs the interrupts fastest of the three output paths.

The path that outputs the fastest interrupts is referred to as an interrupt handling path (IHP) hereinafter.

In other words, the IHP is a path having the shortest output delay and thus having the least remaining amount of a buffer memory in the memory 3.

That is, by performing a synchronization determination process, a decode process, and a buffer management process on the basis of interrupts from the output path having the least remaining buffer memory, the audio decoder 104 of this embodiment can achieve efficient buffer management and thus the reduction of control burdens on the control unit 21.

This also leads to the significant reduction of burdens imposed on each component of the control unit 21 and the audio decoder 104 and to nimbler operation, compared with performing a decode process and a buffer management process in response to all interrupts from the three output paths.

Here, when performing a decode process and a buffer management process in response to an interrupt from one of the output paths, the overflow or underflow of each of the buffers 31 to 33 in the memory 3 should be taken into account. However, by performing those processes triggered by interrupts from the IHP having the least remaining buffer memory, the overflow or underflow problem can be addressed.

Now, a synchronization determination process will be described. In related art, an audio decoder having a plurality of output paths has performed the process after notifying interrupts from predetermined paths. On the other hand, the audio decoder 104 of this embodiment performs the process on the basis of interruptions from the IHP.

Figure 3A:
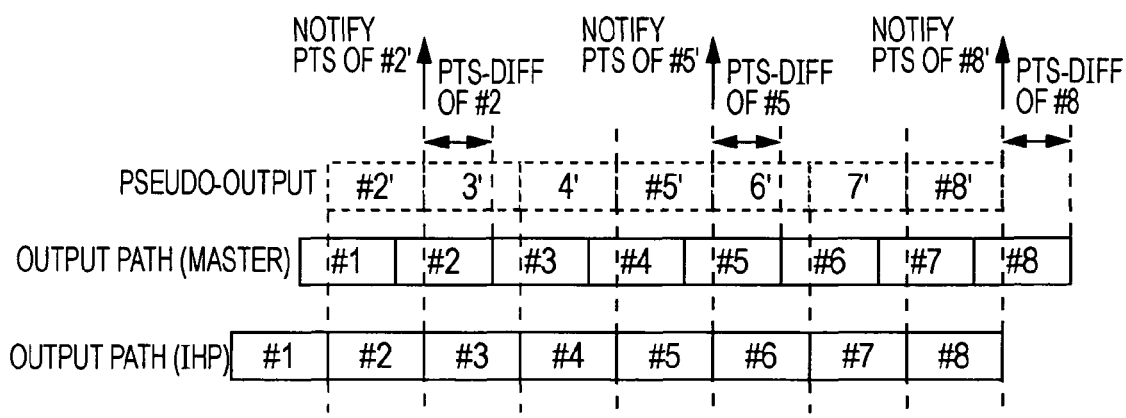
FIGS. 3A and 3B are time charts illustrating interrupt notification timings for synchronization determination in an audio decoder according to an embodiment of the present invention.
Figure 3B:
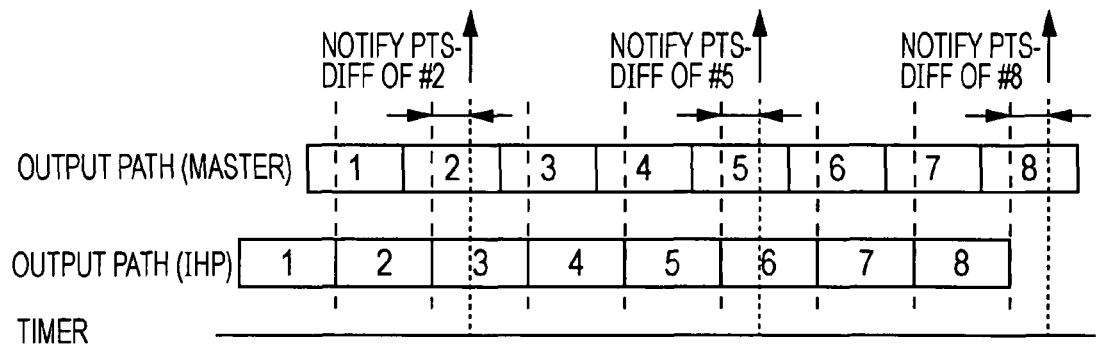

FIGS. 3A and 3B are time charts illustrating interrupt notification timings for synchronization determination in the audio decoder 104 of this embodiment.

FIG. 3A shows a time chart on performing synchronization determination using interruptions from the IHP.

A master output path is a predetermined path used for synchronization determination.

The IHP is the output path that outputs data fastest of all output paths. Packetized Elementary Streams (PESs) #1, #2, etc. are packetized elementary streams (ESs). AV synchronization is performed by notifying a PTS (Presentation Time Stamp) value stored in the header of the PES.

Specifically, as shown in FIGS. 3A and 3B, the PTS of the IHP is notified, as well as a difference diff between the PTS of the master output path and that of the IHP is calculated and notified.

Thus, although only the IHP's PTS is actually notified, the PTS of the master output path can be calculated from the known difference diff. In this way, a synchronization determination process can be done.

Alternatively, as shown in FIG. 3B, a synchronization determination may be performed using a timer interruption from a predetermined timer being separately provided.

That is, as shown in the drawing, the process of synchronization determination may be performed in response to the timer interrupts that generate interrupt signals with a difference diff between the PTS of a master output path and that of the IHP being notified simultaneously every predetermined time (e.g., 200 ms).

The PTS of the master output path may also be notified to perform a synchronization determination process in this manner.

As described above, the audio decoder 104 of this embodiment has been configured to perform a synchronization determination process, a decode process, and a buffer management process in response to interrupts from the IHP.

Hereinafter, a method for specifying the IHP on the path activation will be described.

Figure 4:
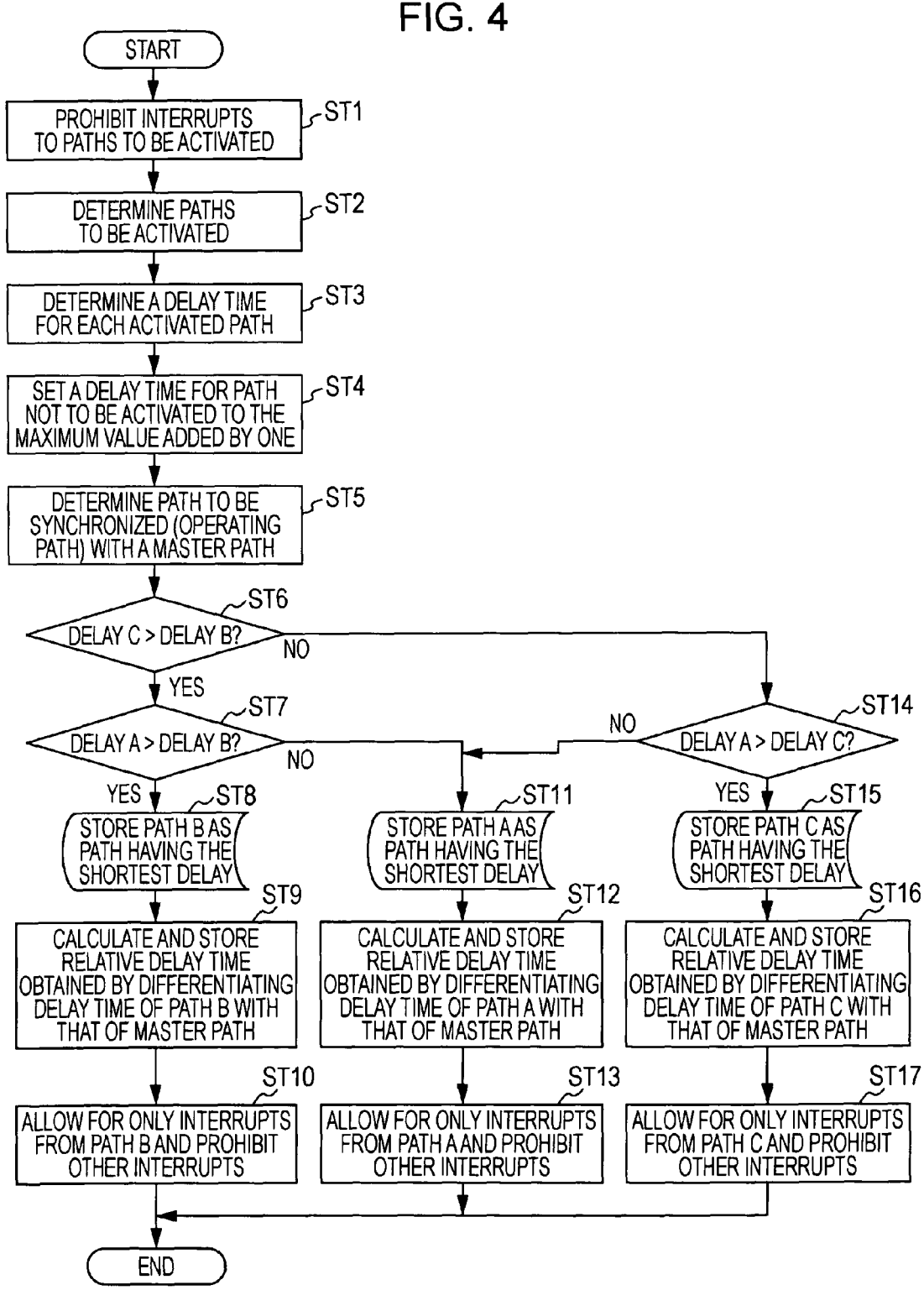
FIG. 4 is a flow chart for illustrating a method of setting an output path when any of the paths A to C is to be specified as an IHP in an audio decoder.

FIG. 4 is a flow chart for illustrating a method of setting an output path when any of the paths A to C is to be specified as the IHP in the above-described audio decoder 104.

At step ST1,
a control unit 21 prohibits any interrupts from output paths A to C in preparation of the activation of the output path.

At step ST2,
the unit 21 selects the output paths to be activated from among the paths A to C.

At step ST3,
the unit 21 determines a delay time for each path to be activated.

At step ST4,
the unit 21 sets all paths not to be activated to a maximum value added by 1. The maximum value may be a time period long enough also for transferring one packet in audio stream, for example.

At step ST5,
the unit 21 selects a master output path.

At step ST6,
the unit 21 determines whether or not the delay time of path C (DELAY C) is larger than that of path B (DELAY B). If so, the process proceeds to step ST7, otherwise to step ST14.

At step ST7,
the unit 21 determines whether or not the delay time of path A (DELAY A) is larger than that of path B (DELAY B). If so, the process proceeds to step ST8, otherwise to step ST11.

At step ST8,
the unit 21 selects path B as the path having the shortest delay time, i.e., the IHP.

At step ST9,
the unit 21 calculates a difference (i.e., relative delay time) diff between the delay time of path B, DELAY B, and that of the master path set at step ST5, DELAY M, and stores the difference.

At step ST10,
the unit 21 allows for only interrupts from the path B and prohibits other interrupts.

Thus, interrupts used for the synchronization determination process, the decode process, and the buffer management process are restricted to those from the path B, so the burdens on the audio decoder 104 associated with the above processes can be reduced.

At step ST11,
the unit 21 sets path A as the path having the shortest delay time, i.e., the IHP.

At step ST12,
the unit 21 calculates the difference (i.e., relative delay time) diff between the delay time of path A, DELAY A and that of the master path set at step ST5, DELAY M, and stores the difference.

At step ST13,
the unit 21 allows for only interrupts from the path A and prohibits other interrupts.

Thus, interrupts used for the synchronization determination process, the decode process, and the buffer management process are restricted to those from the path A, so the burdens on the audio decoder 104 associated with the above processes can be reduced.

At step ST14,
the unit 21 determines whether or not the delay time of path A (DELAY A) is larger than that of path C (DELAY C). If so, the process proceeds to step ST15, otherwise to step ST11.

At step ST15,
the unit 21 sets the path C as the path having the shortest delay time, i.e., the IHP.

At step ST16,
the unit 21 calculates the difference (i.e., relative delay time) diff between the delay time of the path C, DELAY C and that of the master path set at step ST5, DELAY M, and stores the difference.

At step ST17,
the unit 21 allows for only interrupts from the path C and prohibits other interrupts.

Thus, interrupts used for the synchronization determination process, the decode process, and the buffer management process are restricted to those from the path C, so the burdens on the audio decoder 104 associated with the above processes can be reduced.

With the above process, since interrupts that trigger the synchronization determination process, the decode process, and the buffer management process can be restricted to one output path having the shortest delay, the burdens on each component in the audio decoder 104 according to this embodiment can be reduced.

Now, a method for disabling the IHP set by the method described in FIG. 4 and changing the IHP to another path will be described.

Figure 5:
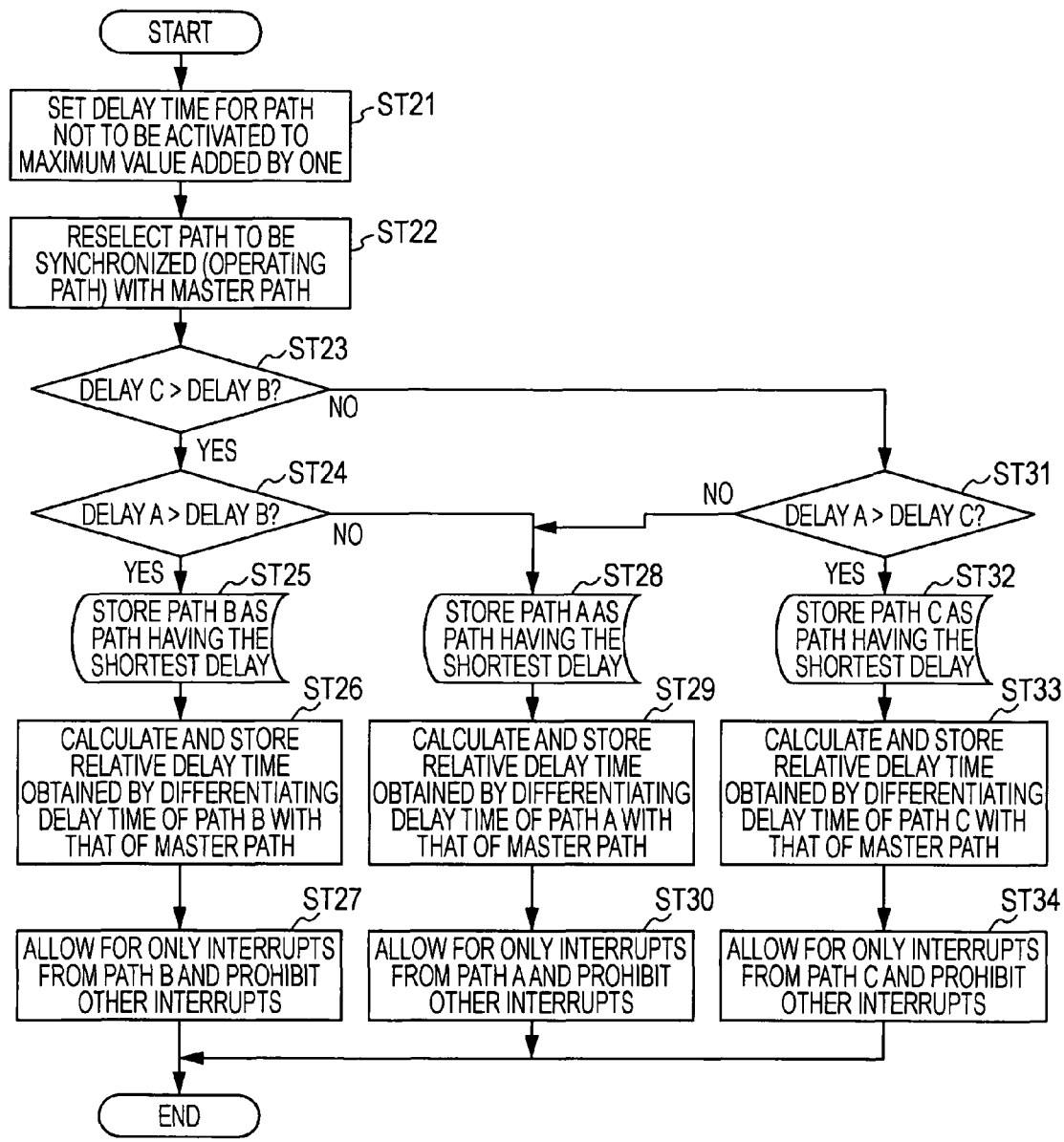
FIG. 5 is a flow chart illustrating a method of terminating the set path and changing the IHP to another path.

FIG. 5 is a flow chart illustrating a method of disabling the set IHP and changing the IHP to another path.

At step ST21,
the control unit 21 sets all paths not to be activated to a maximum value added by 1. The maximum value may be a time period long enough also for transferring one packet in audio stream, for example.

At step ST22,
the unit 21 selects the master output path.

At step ST23,
the control unit 21 determines whether or not the delay time of path C (DELAY C) is larger than that of path B (DELAY B). If so, the process proceeds to step ST24, otherwise to step ST31.

At step ST24,
the unit 21 determines whether or not the delay time of path A (DELAY A) is larger than that of path B (DELAY B). If so, the process proceeds to step ST25, otherwise to step ST28.

At step ST25,
process unit 21 sets path B as the path having the shortest delay time, i.e., the IHP.

At step ST26,
the unit 21 calculates the difference (i.e., relative delay time) diff between the delay time of path B, DELAY B, and that of the master path set at step ST22, DELAY M, and stores the difference.

At step ST27,
the unit 21 allows for only interrupts from the path B and prohibits other interrupts.

Thus, interrupts used for the synchronization determination process, the decode process, and the buffer management process are restricted to those from the path B, so the burdens on the audio decoder 104 associated with the above processes can be reduced.

At step ST28,
the unit 21 sets path A as the path having the shortest delay time, i.e., the IHP.

At step ST29,
the unit 21 calculates the difference (i.e., relative delay time) diff between the delay time of path A, DELAY A and that of the master path set at step ST22, DELAY M, and stores the difference.

At step ST30,
the unit 21 allows for only interrupts from the path A and prohibits other interrupts.

Thus, interrupts used for the synchronization determination process, the decode process, and the buffer management process are restricted to those from the path A, so the burdens on the audio decoder 104 associated with the above processes can be reduced.

At step ST31,
the unit 21 determines whether or not the delay time of path A (DELAY A) is larger than that of path C (DELAY C). If so, the process proceeds to step ST32, otherwise to step ST28.

At step ST32,
the unit 21 sets path C as the path having the shortest delay time, i.e., the IHP.

At step ST33,
the unit 21 calculates the difference (i.e., relative delay time) diff between the delay time of path C, DELAY C, and that of the master path selected at step ST22, DELAY M, and stores the difference.

At step ST34,
the unit 21 allows for only interrupts from the path C and prohibits other interrupts.

Thus, interrupts used for the synchronization determination process, the decode process, and the buffer management process are restricted to those from path C, so the burdens on the audio decoder 104 associated with the above processes can be reduced.

As described above, the IHP having the shortest delay may be changed to another path.

Now, a method of controlling an interrupt monitoring and a buffer management (for data reading) of each output path by the control unit 21 will be described.

Figure 6:
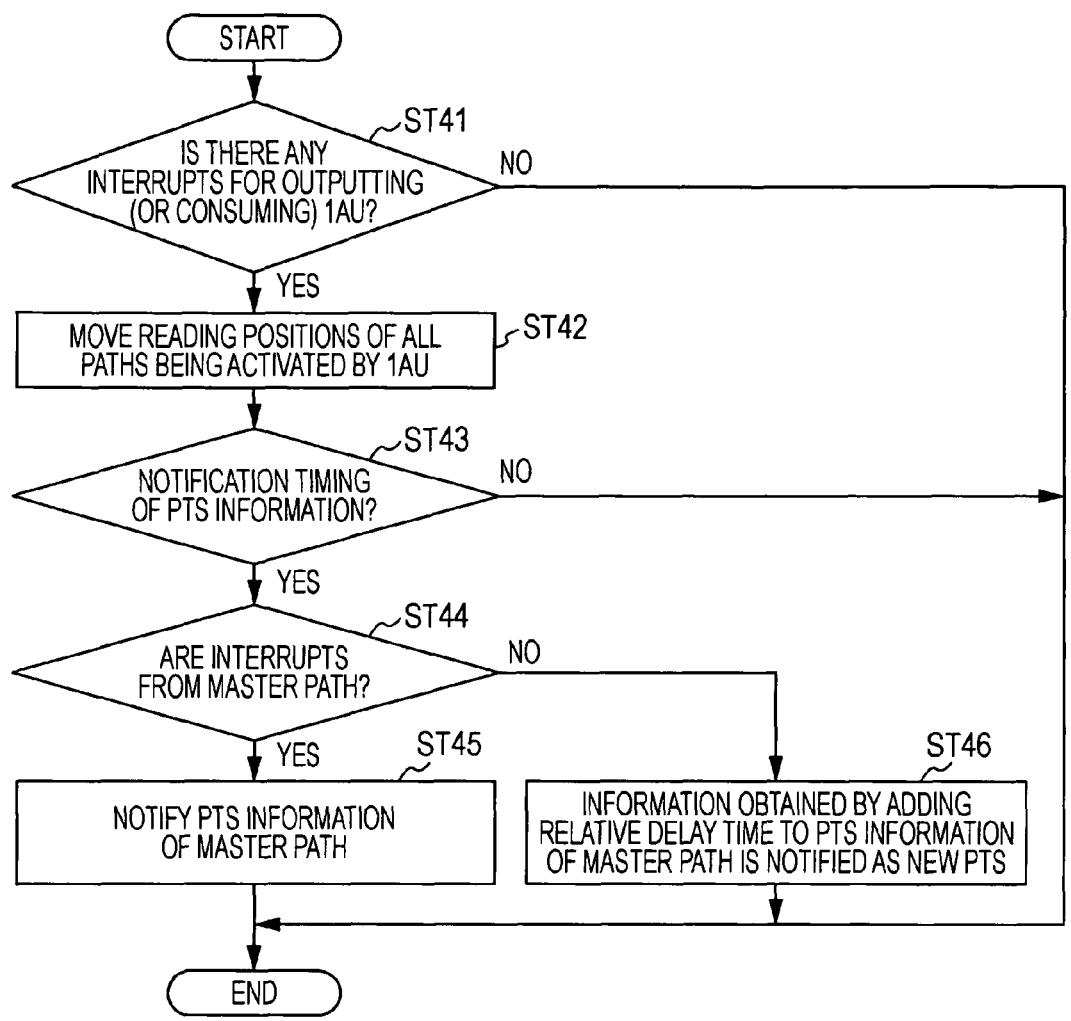
FIG. 6 is a flow chart illustrating control by a control unit of an interrupt monitoring and a buffer management process (for reading) of each output path.

FIG. 6 is a flow chart illustrating this process controlling an interrupt monitoring and a buffer management (for data reading) of each output path by the control unit 21 will be described.

At step ST41,
the control unit 21 determines whether or not there are any interrupts requesting for the output of audio packet data corresponding to one predetermined time unit (referred to as "1AU" hereinafter). The predetermined time unit may be, for example, time necessary for transferring one PES, or time necessary for writing to or reading from each buffer in the memory 3.

If there are any interrupts, the process proceeds to step ST42, otherwise the process terminates.

At step ST42,
the unit 21 moves by 1AU the read positions in each buffer in the memory 3 corresponding to all output paths being activated at that time. Thus, read positions of all output paths can be updated.

At step ST43,
the unit 21 determines whether or not it is a Presentation Time Stamp (PTS) notification timing.

The PTS notification timing is a timing predetermined for notifying a PTS. For example, if the timing is configured so that a notification can be done on reading data worth several AUs, then the PTS will be notified after the AUs have been read.

If it is the PTS notification timing, the process proceeds to step ST44, otherwise the process terminates.

At step ST44,
the unit 21 determines whether or not an interrupt is from the master output path.

If so, the process proceeds to step ST45, otherwise to step ST46.

At step ST45,
the unit 21 notifies the PTS information of the master output path.

At step ST46,
the unit 21 adds the difference diff between the delay time of a path interrupted and that of the master output path to the latter delay time and notifies the result as PTS information.

With the above configuration, the read positions in each buffer in the memory 3 corresponding to all output paths being activated at that time are moved by 1AU so that the read positions of all output paths can be updated.

Now, a method of controlling a decode process and a buffer management process (for data writing) by the control unit 21 will be described.

FIG. 7 is a flow chart illustrating these processes controlling a decode process and a buffer management process (for data writing) by the control unit 21.

At step ST51,
the control unit 21 determines whether there are any interrupts requesting for the output of audio data of 1AU.

If so, the process proceeds to step ST53, otherwise to step ST52.

At step ST52,
the unit 21 determines whether there are any requests for the decoding of audio data of 1AU.

If so, the process proceeds to step ST53, otherwise the process terminates.

At step ST53,
it is determined whether there are any buffers in buffers corresponding to the active paths in a buffer-full status.

The buffer-full status is defined as a status that at least one of three buffers corresponding to three output paths is full (or near full). In this case, if there is not any output from the path being buffer-full and having the longest delay time, decoding or writing to the buffer may not be started as the buffer is near full.

When there is a buffer in the buffer-full status among the buffers corresponding to the three paths, the process terminates, otherwise the process proceeds to step ST54.

At step ST54,
the unit 21 performs a decode process of the AU requested at step ST52.

Note that the present embodiment does not limit the details of the decode process, and any existing techniques may be used for that process.

At step ST55,
the control unit 21 stores the data decoded at step ST54 in a corresponding buffer.

At step ST56,
the unit 21 stores the PTS of the AU decoded at step ST54 in the memory 1 paired with the memory 3 having a storage buffer.

At step ST57,
the control unit 21 moves the write positions in each buffer in the memory 3 corresponding to all output paths being activated at that time by 1AU. Thus, the write positions of all output paths can be updated.

With the above configuration, the write positions in each buffer in the memory 3 corresponding to all output paths being activated at that time are moved by 1AU so that the write positions of all output paths can be updated.

Additionally, as the unit 21 completes the process when there are any buffers being buffer-full, it can be avoided without imposing unnecessary burdens on buffers that the speed of the entire process of the audio decoder 104 gets slower.

As described above, according to the AV system 100 of the present embodiment, since interrupts that trigger the synchronization determination process, the decode process, and the buffer management process can be restricted to one output path having the shortest delay, the processing burdens on each component can be reduced.

Also, the system is convenient as an output path having the shortest delay can be freely switched.

Also, for a buffer management process, on reading, the read positions in each buffer in the memory 3 corresponding to all output paths being activated at that time are moved by 1AU so that the read positions of all output paths can be updated, whereas on writing, the write positions in each buffer in the memory 3 corresponding to all output paths being activated at that time are moved by 1AU so that the write positions of all output paths can be updated.

Additionally, for the buffer management process on writing, as the unit 21 completes the process when there are any buffers being buffer-full, it can be avoided without imposing unnecessary burdens on buffers that the speed of the entire process of the audio decoder 104 gets slower.

It will be understood that the invention is not limited to the embodiments described above, and various modifications or alternations may be made to each component of the embodiments without departing from the scope of the technical aspects or equivalents thereto of the present invention.

Although a method has been described that the audio decoder 104 adjusts a delay time and performs AV synchronization in the embodiments described above, the present invention is not so limited, and a video decoder may adjust the delay time for each path and perform the AV synchronization.

The present application contains subject matter related to that disclosed in Japanese Priority Patent Application JP 2008-227506 filed in the Japan Patent Office on Sep. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio visual system comprising:
    an input unit for receiving data containing video data and audio data and dividing the data into the audio data and the video data;
    a video decoder for decoding the video data divided by the input unit;
    an audio decoder for decoding the audio data divided by the input unit; and
    an output unit for superimposing and outputting the video data decoded by the video decoder and the audio data decoded by the audio decoder,
    wherein at least one of the video decoder and the audio decoder has N>1 data output paths;
    at least one of the video decoder and the audio decoder sets delay times for each of the output paths to synchronize the decoded video data with the decoded audio data
    the at least one of the video decoder and the audio decoder that has the N>1 output paths includes:
    a control unit for performing a decode process of decoding the video data or audio data divided by the input unit;
    N buffer memories for storing the video data or audio data that has been decoded by the control unit, each buffer memory corresponding to a different one of the output paths; and
    N output interfaces that each corresponds to a different one of the output paths,
    each output interfaces reads the decoded video data or audio data from the corresponding buffer memory and each output interface sends, according to control of the control unit, an interrupt signal to the control unit every time reading a predefined amount of data is read by the respective output interface from the corresponding buffer memory; and
    the control unit performs the decode process and a buffer management process to manage writing or reading of the decoded video data or audio data to or from the buffer memories at timings according to the timings of interrupt signals sent from the output interface having the shortest delay between successive interrupt signals generated by the respective output interface, and not according to interrupt signals generated by other output interfaces;
    wherein the control unit allows only the output interface having the shortest delay between successive interrupt signals generated by the respective output interface to output interrupt signals to the control unit and prohibits other output interfaces from outputting interrupt signals to the control unit.

2. The audio visual system according to claim 1, wherein when the at least one of the video encoder and the audio encoder sets delay times for each of the output paths to synchronize the decoded video data with the decoded audio data, the control unit:
    when performing the synchronization by notifying notifies the respective decoder of the completion of the output of the predetermined amount of visual data or audio data from the output interfaces of predetermined output paths,
    notifies the respective decoder of the completion of the output of the predetermined amount of visual data or audio data from the output interface having the shortest delay between successive interrupt signals generated by the respective output interface, and,
    notifies the respective decoder of the temporal difference between the completion of the output of the predetermined amount of visual data or audio data from the output interface having the shortest delay between successive interrupt signals generated by the respective output interface and the completion of the output from the predetermined output paths.

3. The audio visual system according to claim 2, wherein the control unit, in response to an interrupt signal associated with reading of a predetermined amount of the visual data or audio data, moves a reading position of the buffer memories associated with all of the output paths in use by a set amount.

4. A decoder comprising:
    N>1 output paths;
    a control unit for performing a decode process of decoding video data or audio data and outputting decoded data on N paths corresponding to N output paths;
    N buffer memories for storing the decoded data output by the control unit, each buffer memory corresponding to a different one of the output paths; and
    N output interfaces that each corresponds to a different one of the output paths and reads the decoded data stored in the corresponding buffer memory, wherein, and
    each output interface reads the decoded video data or audio data from the corresponding buffer memory and each output interface sends, according to control of the control unit, an interrupt signal to the control unit every time reading a predefined amount of data is read by the respective output interface from the corresponding buffer memory, and
    the control unit performs the decode process and a buffer management process to manage writing or reading of the decoded video data or audio data to or from the buffer memories at timings according to the timings of interrupt signals sent from the output interface having the shortest delay between successive interrupt signals generated by the respective output interface, and not according to interrupt signals generated by other output interfaces;

wherein the control unit allows only the output interface having the shortest delay between successive interrupt signals generated by the respective output interface to output interrupt signals to the control unit and prohibits other output interfaces from outputting interrupt signals to the control unit.

5. The audio visual system of claim 1, wherein each of the output paths corresponds to a different format type of audio or video output.

6. The audio visual system of claim 5, wherein the output paths correspond audio output formats comprising: 5.1 channel audio output, stereo audio output, and S/PDIF audio output.

7. The audio visual system of claim 5, wherein the output paths correspond to video output formats comprising: High Definition (HD) output and Standard Definition (SD) output.

8. The decoder according to claim 4, wherein the decoder includes a video decoder for decoding a video data divided by an input unit; and an audio decoder for decoding an audio data divided by the input unit, wherein when the decoder sets delay times for each of the output paths to synchronize the decoded video data with the decoded audio data, the control unit:

when performing the synchronization by notifying notifies the respective decoder of the completion of the output of the predetermined amount of visual data or audio data from the output interfaces of predetermined output paths, notifies the respective decoder of the completion of the output of the predetermined amount of visual data or audio data from the output interface having the shortest delay between successive interrupt signals generated by the respective output interface, and notifies the respective decoder of the temporal difference between the completion of the output of the predetermined amount of visual data or audio data from the output interface having the shortest delay between successive interrupt signals generated by the respective output interface and the completion of the output from the predetermined output paths.

9. The decoder according to claim 8, wherein the control unit, in response to an interrupt signal associated with reading of a predetermined amount of the visual data or audio data, moves a reading position of the buffer memories associated with all of the output paths in use by a set amount.

10. The decoder of claim 4, wherein each of the output paths corresponds to a different format type of audio or video output.

11. The decoder of claim 10, wherein the output paths correspond audio output formats comprising: 5.1 channel audio output, stereo audio output, and S/PDIF audio output.

12. The decoder of claim 10, wherein the output paths correspond to video output formats comprising: High Definition (HD) output and Standard Definition (SD) output.

* * * * *